(12) United States Patent
Sharma (10) Patent No.: US 9,135,605 B2
(45) Date of Patent: Sep. 15, 2015

(54) INSTANT ELECTRONIC MEETING FROM WITHIN A CURRENT COMPUTER APPLICATION

(75) Inventor: Bhanu Sharma, San Bruno, CA (US)

(73) Assignee: Adobe Systems Incorporated, San Jose, CA (US)

( * ) Notice: Subject to any disclaimer, the term of this patent is extended or adjusted under 35 U.S.C. 154(b) by 870 days.

(21) Appl. No.: 11/564,611

(22) Filed: Nov. 29, 2006

(65) Prior Publication Data

US 2008/0126949 A1  May 29, 2008

(51) Int. Cl.
*G06Q 10/10* (2012.01)

(52) U.S. Cl.
CPC ............ *G06Q 10/107* (2013.01); *G06Q 10/109* (2013.01)

(58) Field of Classification Search
CPC ...................................... G06Q 10/107
USPC .......................................... 709/204; 715/751
See application file for complete search history.

(56) References Cited

U.S. PATENT DOCUMENTS

| | | | | |
|---|---|---|---|---|
| 6,313,854 | B1 * | 11/2001 | Gibson .......................... | 715/788 |
| 6,934,837 | B1 * | 8/2005 | Jaisimha et al. .............. | 713/151 |
| 7,096,417 | B1 * | 8/2006 | Bennett et al. ................ | 715/207 |
| 7,400,322 | B1 * | 7/2008 | Urbach .......................... | 345/419 |
| 7,406,332 | B1 * | 7/2008 | Gaillard et al. ............... | 455/558 |
| 7,827,494 | B1 * | 11/2010 | Hedayatpour et al. ........ | 715/742 |
| 8,577,732 | B1 * | 11/2013 | Martin et al. ................. | 705/26.1 |
| 2002/0147658 | A1 * | 10/2002 | Kwan .............................. | 705/26 |
| 2002/0196273 | A1 * | 12/2002 | Krause .......................... | 345/738 |
| 2003/0023953 | A1 * | 1/2003 | Lucassen et al. ............. | 717/106 |
| 2003/0063119 | A1 * | 4/2003 | Bloomfield et al. .......... | 345/738 |
| 2003/0126558 | A1 * | 7/2003 | Griffin .......................... | 715/513 |
| 2003/0126613 | A1 * | 7/2003 | McGuire ....................... | 725/109 |
| 2003/0187956 | A1 * | 10/2003 | Belt et al. ...................... | 709/219 |
| 2004/0010755 | A1 * | 1/2004 | Hamada ........................ | 715/513 |
| 2004/0030795 | A1 * | 2/2004 | Hesmer et al. ................ | 709/231 |
| 2004/0044454 | A1 * | 3/2004 | Ross et al. ..................... | 701/33 |
| 2004/0254979 | A1 * | 12/2004 | Colling et al. ................ | 709/203 |
| 2004/0268268 | A1 * | 12/2004 | Scheu et al. .................. | 715/835 |
| 2005/0165655 | A1 * | 7/2005 | Kobrosly et al. .............. | 705/26 |
| 2005/0187978 | A1 * | 8/2005 | Qian et al. ................. | 707/104.1 |
| 2005/0188329 | A1 * | 8/2005 | Cutler et al. .................. | 715/804 |
| 2005/0235220 | A1 * | 10/2005 | Duperrouzel et al. ........ | 715/788 |
| 2006/0010125 | A1 * | 1/2006 | Beartusk et al. .................. | 707/4 |
| 2006/0064422 | A1 * | 3/2006 | Arthurs et al. .................. | 707/10 |
| 2006/0129935 | A1 * | 6/2006 | Deinlein et al. .............. | 715/733 |
| 2006/0195779 | A1 * | 8/2006 | McElroy et al. ........... | 715/501.1 |
| 2006/0235935 | A1 * | 10/2006 | Ng ................................ | 709/208 |
| 2006/0277146 | A1 * | 12/2006 | Dively et al. .................. | 705/40 |
| 2007/0112849 | A1 * | 5/2007 | McMullen et al. ........ | 707/103 R |
| 2007/0112913 | A1 * | 5/2007 | Bales ............................ | 709/204 |
| 2007/0155415 | A1 * | 7/2007 | Sheehy et al. ................ | 455/518 |
| 2007/0174410 | A1 * | 7/2007 | Croft et al. .................... | 709/208 |
| 2007/0175998 | A1 * | 8/2007 | Lev ................................ | 235/454 |
| 2007/0214461 | A1 * | 9/2007 | Glatron et al. ................ | 719/321 |
| 2007/0260682 | A1 * | 11/2007 | Guccione ...................... | 709/204 |

\* cited by examiner

*Primary Examiner* — O. C. Vostal
(74) *Attorney, Agent, or Firm* — Kilpatrick Townsend & Stockton LLC (57) ABSTRACT

Real time communication is discussed that may be initiated and maintained from within an web-based application without leaving the context of the underlying application. Within the web-based application, a web frame or portlet is displayed that can maintain a separate and independent communication channel with a data resource and other external resources. When activated by a user of the web application, the web frame or portlet establishes a communication link with an external resource and another party that will take part in a communication exchange. The interaction between the user and the other participant are displayed from within and/or processed by the web frame or portlet without affecting the state of the underlying web application.

21 Claims, 11 Drawing Sheets

INSTANT ELECTRONIC MEETING FROM WITHIN A CURRENT COMPUTER APPLICATION

TECHNICAL FIELD

The present invention is related, in general, to electronic communication, and, more particularly, to instant electronic meetings from within a current computer application.

BACKGROUND

The first Internet was a communications system funded and built by researchers for military use. This Internet, originally known as ARPANET, was embraced by the research and academic communities as a mechanism for scientists to share and collaborate with other scientists. This collaborative network quickly evolved into the information superhighway of commerce and communication. The Internet explosion was due, in part, to the development of the World Wide Web (WWW) and graphically-based Web browsers, which facilitated a more graphically-oriented, multimedia system that uses the infrastructure of the Internet to provide information in a graphical, visual, and interactive manner that appeals to a wider audience of consumers seeking instant gratification.

As the technology underlying transmission bandwidth has grown in conjunction with the accessibility to such increasing transmission bandwidth, a new paradigm for the old idea of Internet collaboration is emerging that takes advantage of the modern graphical, visual world. This new paradigm is also driven by the advance in real-time or time-sensitive data transmission technology, such as Voice over Internet Protocol (VoIP) technology, and the like. Non-Internet videoconferencing, which has generally never been able to completely supplant teleconferencing as a viable means for reliable communications, is slowly fading away in favor of Internet-driven technology, such as collaborative electronic meetings. Services, such as WEBEX COMMUNICATIONS, INC.'S, WEBEX™ electronic meeting or collaboration services offer the ability for users to connect at least initially, across the Internet to share voice, video, and data in real time for meetings, presentations, training, commercial sales, or the like.

Traditionally, electronic meetings or web conferences involve a virtual meeting room which supports various forms of communication such as voice/video communications, document sharing, application sharing, and screen-sharing applications. To launch a web conference, an organizer generally gives each participant a conference time and a Uniform Resource Locator (URL) that connects to the website supporting the virtual meeting room. Accordingly, communication typically begins when participants enter the correct URL during the designated time. However, such a method of web communication prevents spontaneity because the organizer generally coordinates the meeting time and place first, and then supplies the correct URL. Spontaneity is not as critical for typical business related conferences, but in the consumer world, spontaneity is generally very important. As such, if a consumer wants to communicate with a business representative via a web conference, as the technology currently exists, the representative typically still establishes a time and place for the conference and provides the consumer with the proper URL before the conference can begin. Furthermore, if the consumer or representative has the wrong information, the conference will typically fail because one of the participants cannot access the virtual meeting room. In a consumer world that seeks instant gratification and instant information for making purchasing decisions, this cumbersome communication process deters those consumers from seeking immediate assistance thereby decreasing the potential business and diminishes the value of web conferencing for consumer-related applications.

The time delay and administrative overhead of pre-planned web conferences was partially resolved for more immediate-minded interactions by establishing hyperlink-embedded advertisements, such as banner advertisements (banner ads). For example, a consumer sees a banner ad in an application (e.g., a website, a web application, and the like) that includes a "Talk Now" button. Once selected by the consumer, the URL link embedded in the ad takes the consumer out of context of the current application or website and into the business's website. The consumer may have an entire new browser window opened or may have the currently-opened browser jump to the new website.

This process gets the consumer to the business' website, where the consumer may have to wade through several screens of marketing material or advertisements before being presented with a communication option. Furthermore, in order to initiate live communication with a business representative, both the business representative and the consumer generally need to have the same communication application. This may be facilitated by using a common or popular communication application, such as one of the instant messaging (IM) applications, a phone number, or maybe a proprietary application offered by the business. If a proprietary application is used, the consumer would typically need to download and install that application before beginning communication.

Moreover, some businesses or vendors do not maintain websites. Individuals who perform services in a home-based business, sole proprietorship, or other small business may not necessarily maintain a website or, at least, a website with more than just contact information. Such non-web vendors would generally have no adequate means for participating in a similar type of banner ad-driven communication system.

A feature developed to leverage the ubiquity of phones with the Internet is called pay-per-call advertisements. Generally, a pay-per-call advertisement features an advertisement, such as a banner ad, for a service, product, or the like. When a consumer selects the advertisement a separate application or applet, such as a dialer box, pops up prompting for the consumer's phone number. After the consumer enters the phone number, the dialer box places phone calls to the consumer's phone number and the business' phone number, which is typically stored in the code of the advertisement. After both lines are connected, the consumer and business representatives communicate over the telephone. However, this means of communication is limited in that it supports only telephone-based conferences. Furthermore, a consumer may be hesitant to enter his or her phone number, believing that by doing so, he or she would become subject to telemarketing calls or other personal phone-based invasions. Especially in cases where the business' phone number or any other contact information is not displayed in the advertisement, which it would not require.

Such limitations are partially overcome by Instant Messaging (IM) which supports a variety of communications including text, video, voice, and data. Traditional communication over the internet via IM requires each participant use the same IM client such as AMERICA ONLINE-INSTANT MESSENGER® (AIM(®) or YAHOO MESSENGER®. When a user wants to launch a communication session, the user logs into an TM client, selects a buddy from his/her buddy list, and sends the buddy an invitation to communicate. Thereafter, if the buddy is currently logged into the same IM client, the IM client sends the invitation to the buddy asking whether the buddy wants to join a communication session. If the buddy accepts, the IM client launches the communication session, and the user and buddy communicate via the IM client application.

Accordingly, traditional IM communications have considerable limitations. First, because different IM clients are generally not compatible with each other, IM requires both the user and buddy to utilize the same IM client. Therefore, in a business setting, if the consumer utilizes AIMO and the business utilizes YAHOO MESSENGER®, the consumer and business generally can not communicate. Furthermore, traditional IM clients do not allow strangers to set up web conferences. Therefore, if a consumer wants to communicate with a business, the consumer typically must search for the business's IM user name, add the business to his/her buddy list, and then the user can send the business an invitation to communicate. Such a process again slows communication, thereby undermining spontaneity.

BRIEF SUMMARY

The present invention is directed to a real time communication system, method, and computer program product for allowing a real time communication session to be initiated and maintained from within an on-going web-based application without leaving the context of the underlying web application. Within the web-based application, a web frame or portlet is displayed that can maintain a separate and independent communication channel with data resources and other external resources. When activated by a user of the web application, the web frame or portlet establishes a communication link with the data source or external resource and another one or more parties that will take part in a communication exchange. The interaction between the user and the other participant are displayed and managed from within the web frame or portlet without affecting the state of the underlying web application. This interaction may also involve chat, voice, video, file sharing, screen sharing, and the like. Audio data may include telephony standards, such as VoIP, session initiation protocol (SIP), and the like. Thus, the communication session between the user and the remote participant may take place in real-time upon the user selecting a communication trigger displayed within the web application and does so without removing the user from the context of the underlying web application, even when the interaction causes the portlet or web frame to resize or expand to overlap part of the underlying web application.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

Figure 1:
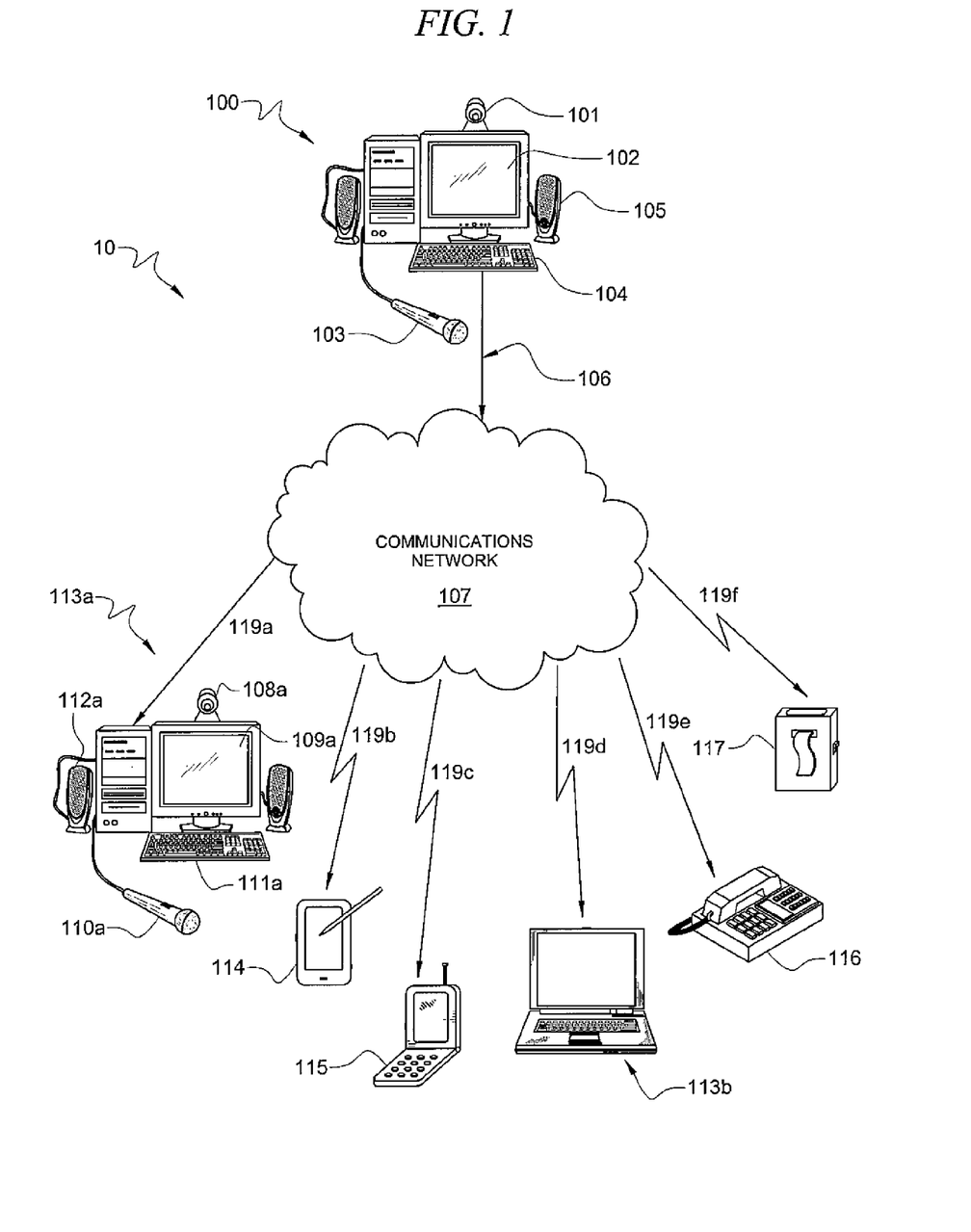
FIG. 1 shows a bock diagram illustrating one embodiment of an electronic communications system configured according to the embodiment of the present invention.

FIG. 1 shows a bock diagram illustrating one embodiment of an electronic communications system 10 configured according to one embodiment of the present invention. In this communications system example, user computer 100 is currently running a computer application such as word processor, graphics program, website, or the like. While user computer 100 runs the current application, the user can communicate with another person from within the currently running application. User computer 100 equips the user with a variety of communication options including voice communications via microphone 103 and speaker 105, video communications via camera 101, data communications via monitor 102, textual communications via keyboard 104, and the like. Furthermore, communications channel 106 connects user computer 100 to communications network 107. One skilled in the art will understand communications network 107 can be any one of a variety of communications networks including but not limited to the Internet, a Local Area Network (LAN), or a Wide Area Network (WAN).

When utilizing the current computer application to communicate with another person, the user instructs the current application to invite another person to participate in an electronic meeting. Accordingly, the current application instructs user computer 100 to send a notification over communications channel 106 through communications network 107 and communications channel 119a to participant's computer 113a. This notification invites the participant to immediately join an electronic meeting with the user. If the participant accepts the invitation, the current application running on user computer 100 immediately launches the electronic meeting without transporting the user out of the running state of the current application.

During this electronic meeting, the user and participant freely communicate with each other via communications network 107. Thus, microphone 110a, speaker 112a, camera 108a, monitor 109a, and keyboard 111a allows the participant to choose the method of communication used during the electronic meeting. Furthermore, the user and/or participant are not limited to communicating via a computer. Accordingly, any combination of Personal Digital Assistant (PDA) 114, cell phone 115, laptop computer 113b, telephone 116, pager 117, or the like can support the user and/or participant in an electronic meeting via each device's communication channel 119a-f.

Figure 2:
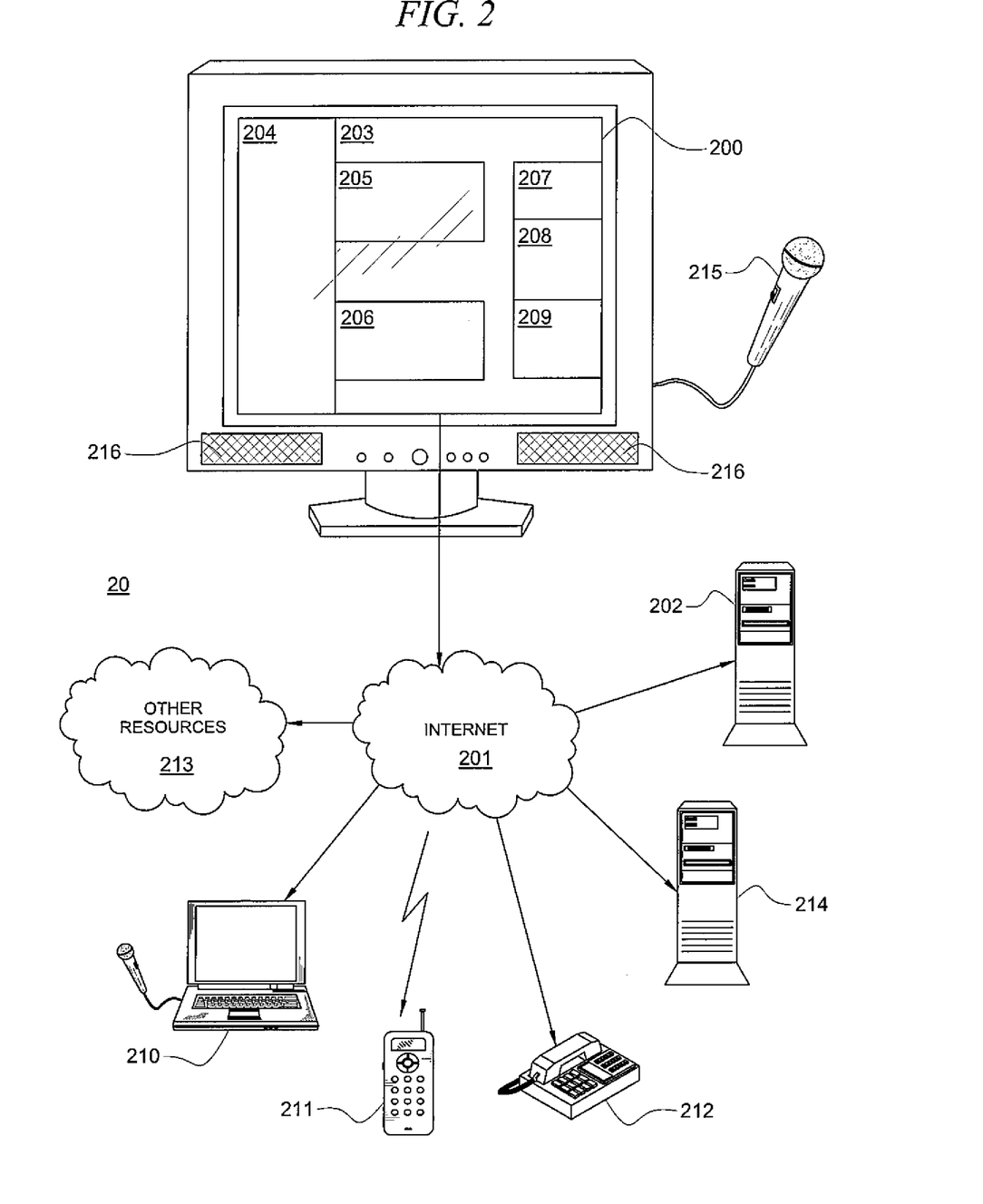
FIG. 2 is a block diagram illustrating a real time communication system configured according to one embodiment of the present invention.

FIG. 2 is a block diagram illustrating real time communication system 20 configured according to one embodiment of the present invention. In real time communication system 20, web browser 200 communicates over Internet 201 with content server 202. Content server 202 may comprise a standard web server, an application server, an advanced communication server, or similar such systems. On request for a page from web browser 200, content server 202 transmits web page 203 over Internet 201 for display on web browser 200. Web page 203, delivered by content server 202 and displayed by web browser 200, supports multiple independent web frames or portlets, such as portlets 204-209. Portlets 204-209 maintain direct and independent communication with various data providers, such as other resources 213 or even content server 202. As new data is available for portlets 204-209, the web frame or portlet content may be updated and refreshed asynchronously without requiring a full page refresh of web page 203. Example technologies that may be used to implement such asynchronous, independent portlets or web frames include Asynchronous JavaScript and Extensible Markup Language (XML), referred to as AJAX, Adobe Systems Incorporated's FLASH®, and the like.

When implemented in FLASH®, each individual portlet, portlets 204-209, are individual running instances of Adobe Systems Incorporated's FLASH® player.Each FLASH® player maintains a communication con content server 202, other resources 213, and the like. The multimedia content displayed in each FLASH® player implementing portlets 204-209 are, thus, updated and refreshed independently from web page 203, which, itself could be a FLASH® file running in its own FLASH® player instance playing within web browser 200. However, as noted above, many different technologies exist for implementing portlets and web frames. The present invention is not merely limited to implementation using FLASH® and the FLASH® player.

In an example operation of one embodiment of the present invention, as depicted in FIG. 2, a vendor, which could be anything from a single person running a home business to a large multinational corporation, provides a banner ad in portlet 207. As the user surfs Internet 201, he or she comes across web page 203. For purposes of this example, web page 203 is a results page from an Internet search. The banner ad displayed in portlet 207 is specifically directed to be placed in portlet 207 when users search for a particular subject matter, tax help for example. The banner ad displayed in portlet 207 prompts the user with a "Call Now" button to discuss tax issues with a certified public accountant (CPA) tax expert for 20% off the normal price. If the user selects the "Call Now" button, portlet 207, running the banner ad, communicates with contact server 214. Contact server 214 verifies that the user is a serious consumer actually desiring to speak with someone. The user interacts with contact server 214 through an interface that is displayed in portlet 207 after the "Call Now" button is selected. The remainder of web page 203, including portlets 204-206 and 208-209, continue operating as normal. When contact server 214 validates the user's request through portlet 207, it attempts to contact the CPA. Contact may be attempted through various multimedia communication protocols, such as voice over Internet Protocol (VoIP), session initiation protocol (SIP), IP multimedia subsystem (IMS), and the like, or through more data-oriented communications, such as IM systems, which often are implemented using VoIP technologies. The user would communicate through the protocol as operated by portlet 207, providing voice input through microphone 215 and can hear remote callers' voices through speakers 216 any data communication would be visible through portlet 207.

In the present example, the CPA is working at laptop 210. When the user is validated, contact server 214 serves up a notification to the CPA at laptop 210 requesting to connect for communication. Once the CPA acknowledges the request, contact server 214 joins the CPA at laptop 210 and the user operating web browser 200. Contact server 214 sends an interface for display in portlet 207 in which the CPA and the user may communicate to discuss the user's tax matters.

It should be noted that real time communication system 20 may be configured to provide various contact methods for the CPA. This allows more flexibility for the CPA to continue whatever he or she is doing, when no contact requests are coming in from the banner ad. A device list may be created by the CPA or other such vendor that provides a stepped sequence of devices for contact server 214 to attempt when contacting the CPA. If, on the initial contact attempt, contact server 214 fails to reach the CPA at laptop 210, contact server 214 attempts to contact the CPA at office phone 212. If contact server 214 again fails to reach the CPA at office phone 212, it will attempt to contact the CPA at mobile phone 211. Any various sequence may be created by the vendors to establish an order for devices that contact server 214 may use to contact the vendor.

Figure 3A:
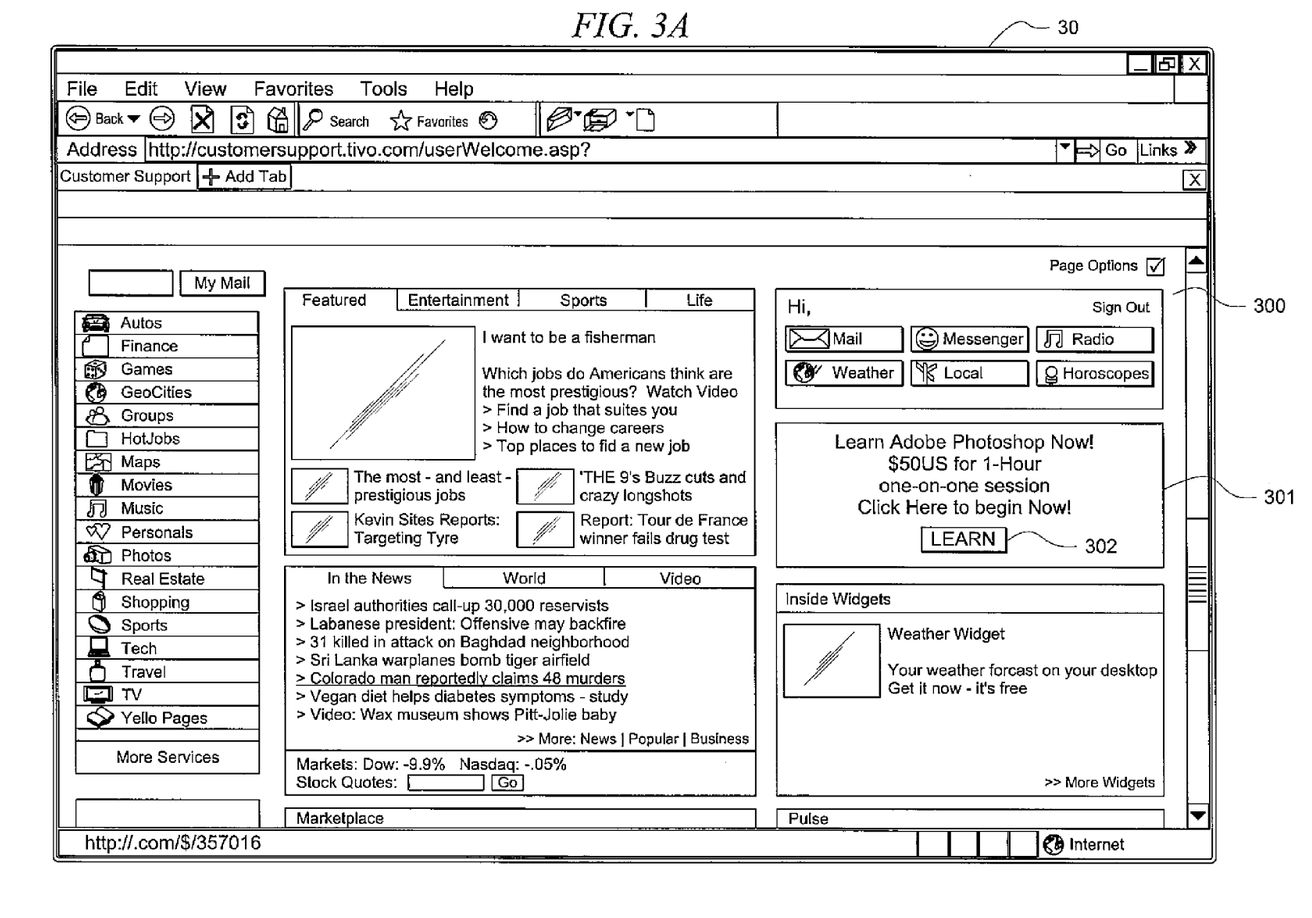
FIG. 3A is a screen shot illustrating a web page operating with a portlet configured according to one embodiment of the present invention.

FIG. 3A is a screen shot illustrating web page 300 operating with portlet 301 configured according to one embodiment of the present invention. A user operating web browser 30 accesses a typical general purpose website, such as the one represented by web page 300. Web page 300 includes various information and links to other information. Located on the side of web page 300 is portlet 301, which displays a banner ad advertising a training course for certain computer applications. Portlet 301 also displays contact button 302, labeled "LEARN." Portlet 301 is sized as a normal sidebar banner ad not unlike other typical banner ads.

Figure 3B:
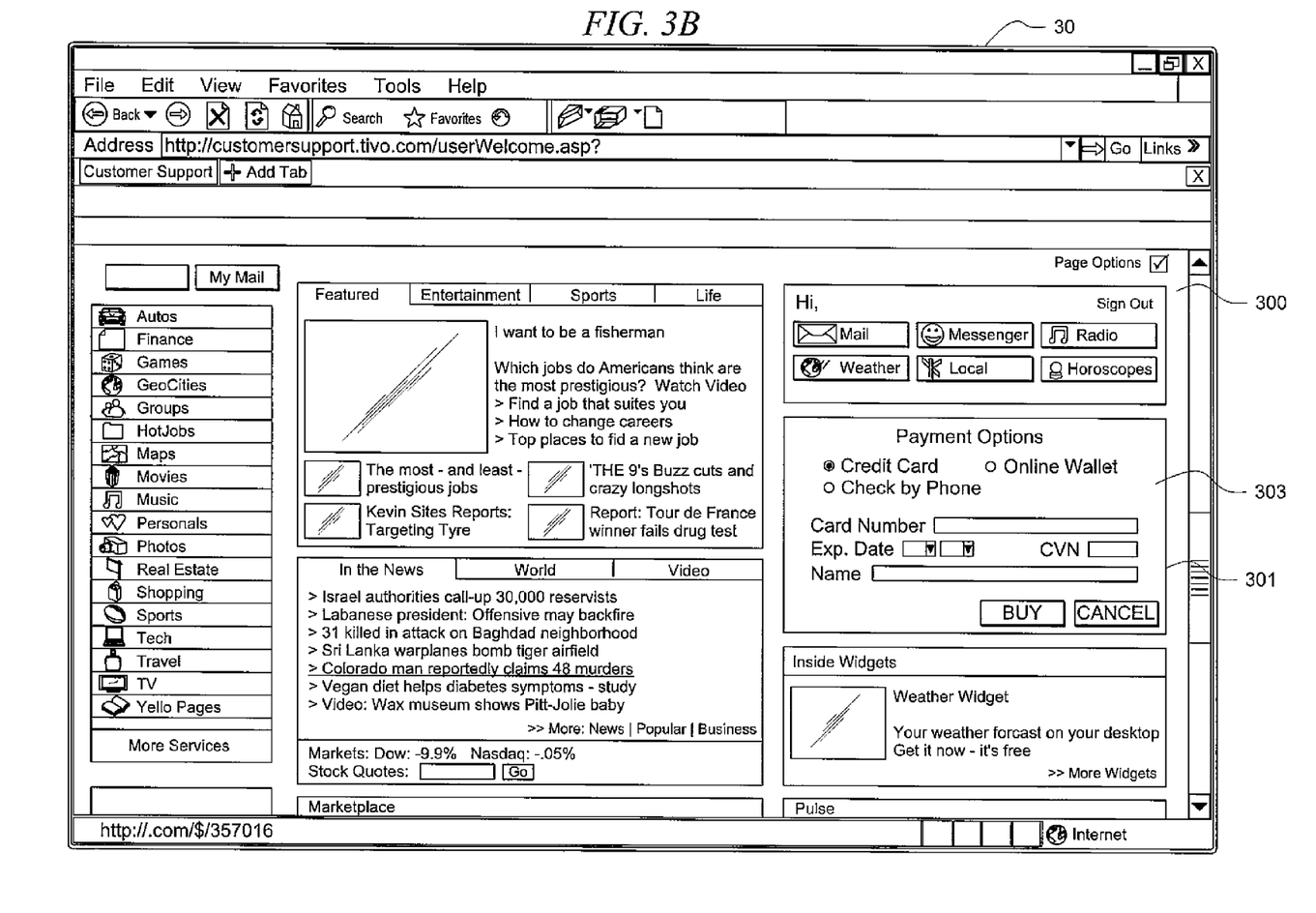
FIG. 3B is a screen shot illustrating the web page further displaying the portlet configured according to one embodiment of the present invention.

FIG. 3B is a screen shot illustrating web page 300 further displaying portlet 301 configured according to one embodiment of the present invention. When the user selects contact button 302 (FIG. 3A), the player instance implementing portlet 301 communicates with a contact server, such as contact server 214 (FIG. 2), to access the validation service to arrange for payment methods. Payment interface 303 is displayed in portlet 301 for the user to select his or her desired payment method.

Figure 3C:
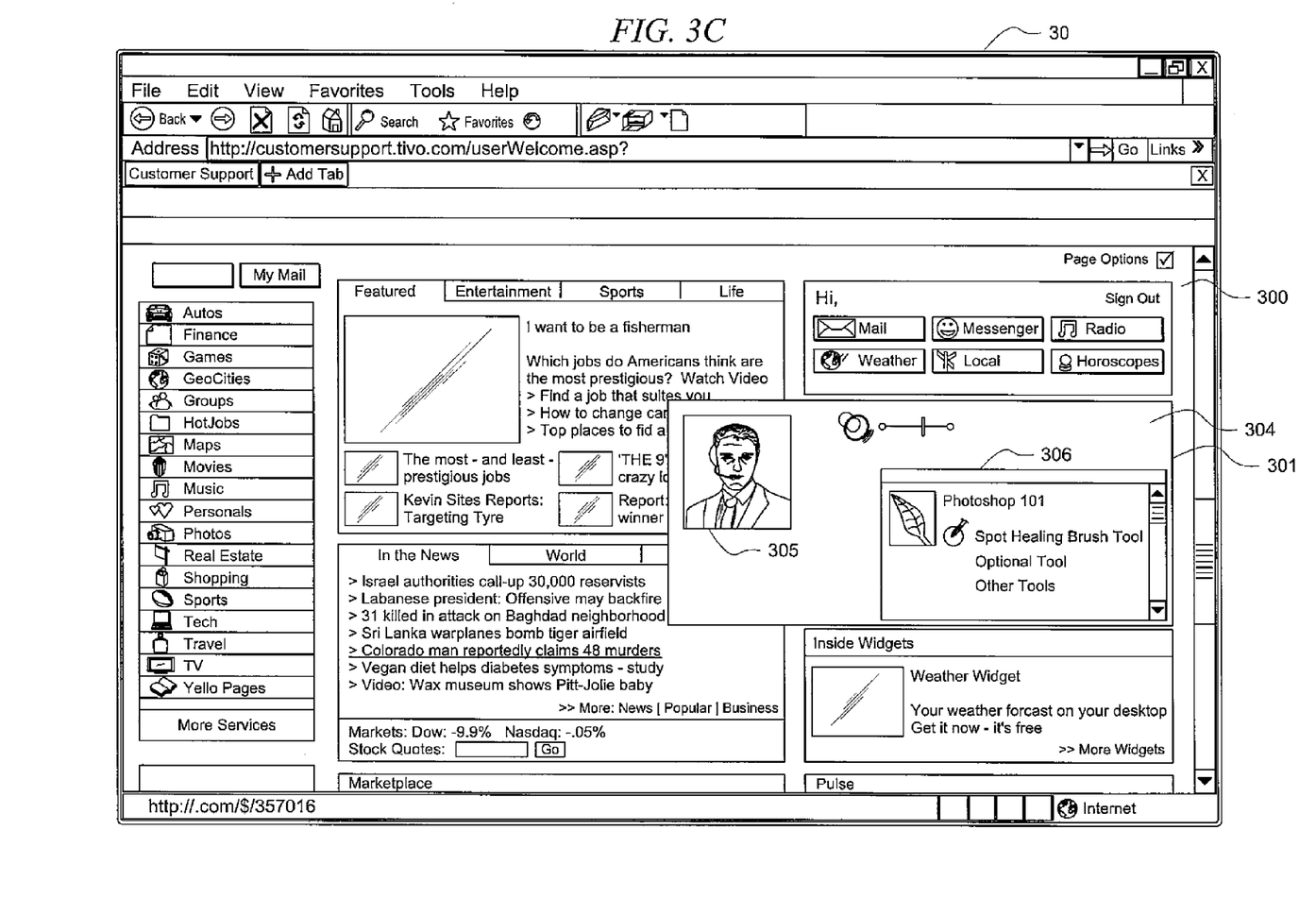
FIG. 3C is a screen shot illustrating the web page with the portlet configured according to one embodiment of the present invention.

FIG. 3C is a screen shot illustrating web page 300 with portlet 301 configured according to one embodiment of the present invention. As the user arranges for payment, contact is made with the training provider and training interface 3 04 is sent for portlet 301 to display. Training interface 304 contains video window 305 which displays the trainer who is leading this training course. It also contains text box 306, which provides a work space for the trainer to display informational documents, example screen shots, or the like. Because the space used for training is generally more than what a typical banner ad would provide, portlet 301 resizes itself within web page 300 to provide more space for the training session. As can be seen in FIG. 3C, even though portlet 301 resizes itself, the remainder of web page 300 remains the same. Portlet 301 simply overlaps the normal display region of web page 300. Thus, the user is entering a training session through portlet 301, but remains within the context of web page 300.

Figure 3D:
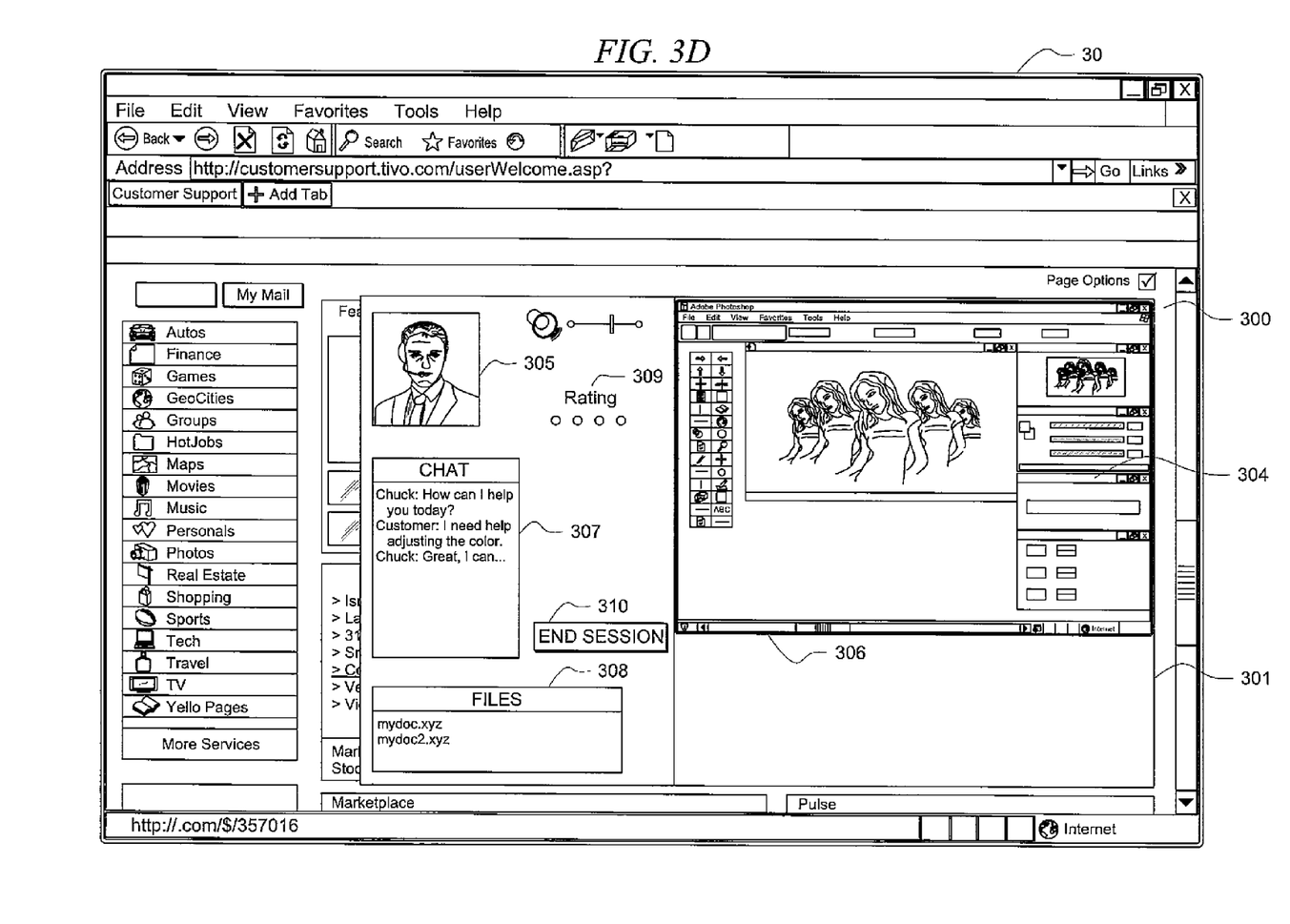
FIG. 3D is a screen shot illustrating the web page including the portlet configured according to one embodiment of the present invention.

FIG. 3D is a screen shot illustrating web page 300 including portlet 301 configured according to one embodiment of the present invention. In addition to providing full video interaction with the trainer through video window 305, and document presentation through text box 306, portlet 301 is also capable of providing full screen-share capability. As the training session moves into a different level, training interface 304 again resizes to accommodate the new training objects being displayed in portlet 301. Again, even though portlet 301 is resizing itself, the user remains in context of web page 300, which continues operating as normal.

During the resizing process, training interface 304 changes the various objects displayed by portlet 301. Video window 305 remains for facilitating communication between the trainer and the user. New objects are added, such as screen share window 306, chat object 307, file download interface 308, rating meter 309, and end session button 310. A full screen of the computer application is presented in screen share window 306. In this interactive object, the trainer can operate the computer application to demonstrate to the user how to perform any various actions. The user views the shared screen of the computer application along with the trainers actions in screen share window 306. In select embodiments, the trainer may also be able to switch control over the shared screen to the user to interact with the example computer application.

The additional screen objects displayed in portlet 301, as shown in FIG. 3D, include chat object 307, where the user or even a third party also participating in a group training session may write questions or otherwise textually communicate. File download interface 308 allows an object for the example files to be made available for download by the user. Rating meter 309 provides a interface for the user to rate the particular training session, while end session button 310 allows the user to select to end the current training. If the user selects end session button 310, the training session will end and portlet 301 will return is size as provided in FIG. 3A.

It should be noted that the example described and illustrated in FIGS. 3A-D are merely examples of some of the screen objects and portlet operations that may be used in various additional and alternative embodiments of the present invention. Any type of such screen objects and/or portlet operations may be beneficially implemented in the various embodiments of the present invention.

Figure 4A:
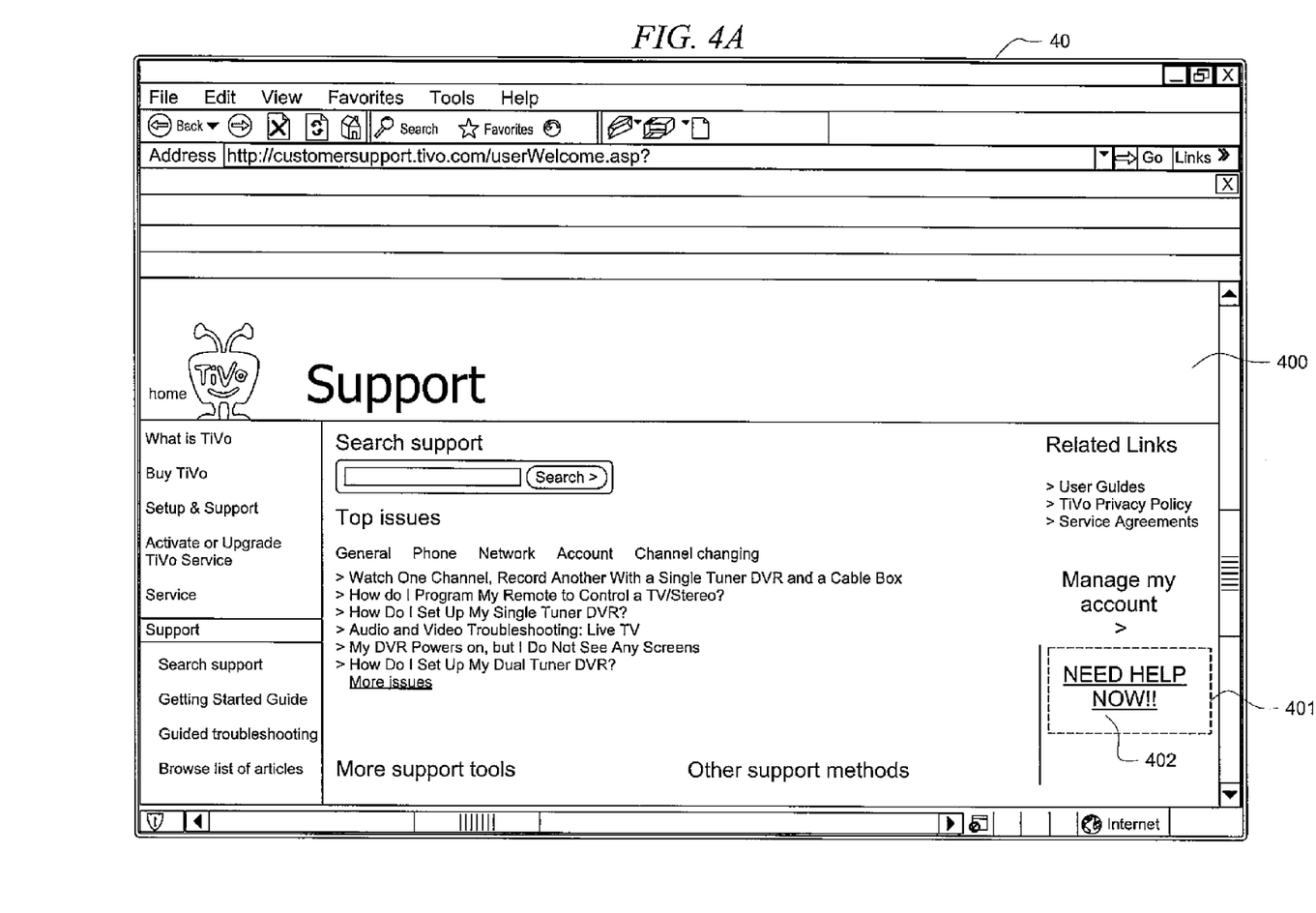
FIG. 4A is a screen shot illustrating a web page displaying a web frame configured according to one embodiment of the present invention.

In addition to consumer applications as described in FIGS. 3A-D, embodiments of the present invention may be used in provide help or support for various tasks. FIG. 4A is a screen shot illustrating web page 400 displaying web frame 401 configured according to one embodiment of the present invention. Web page 400 represents a support page for a digital video recorder (DVR) company. It includes various typical hyperlinks to other portions of the company website and to self-help documents. On the right sidebar of web page 400, web frame 401 includes hyperlink 402 labeled, "NEED HELP NOW."

Figure 4B:
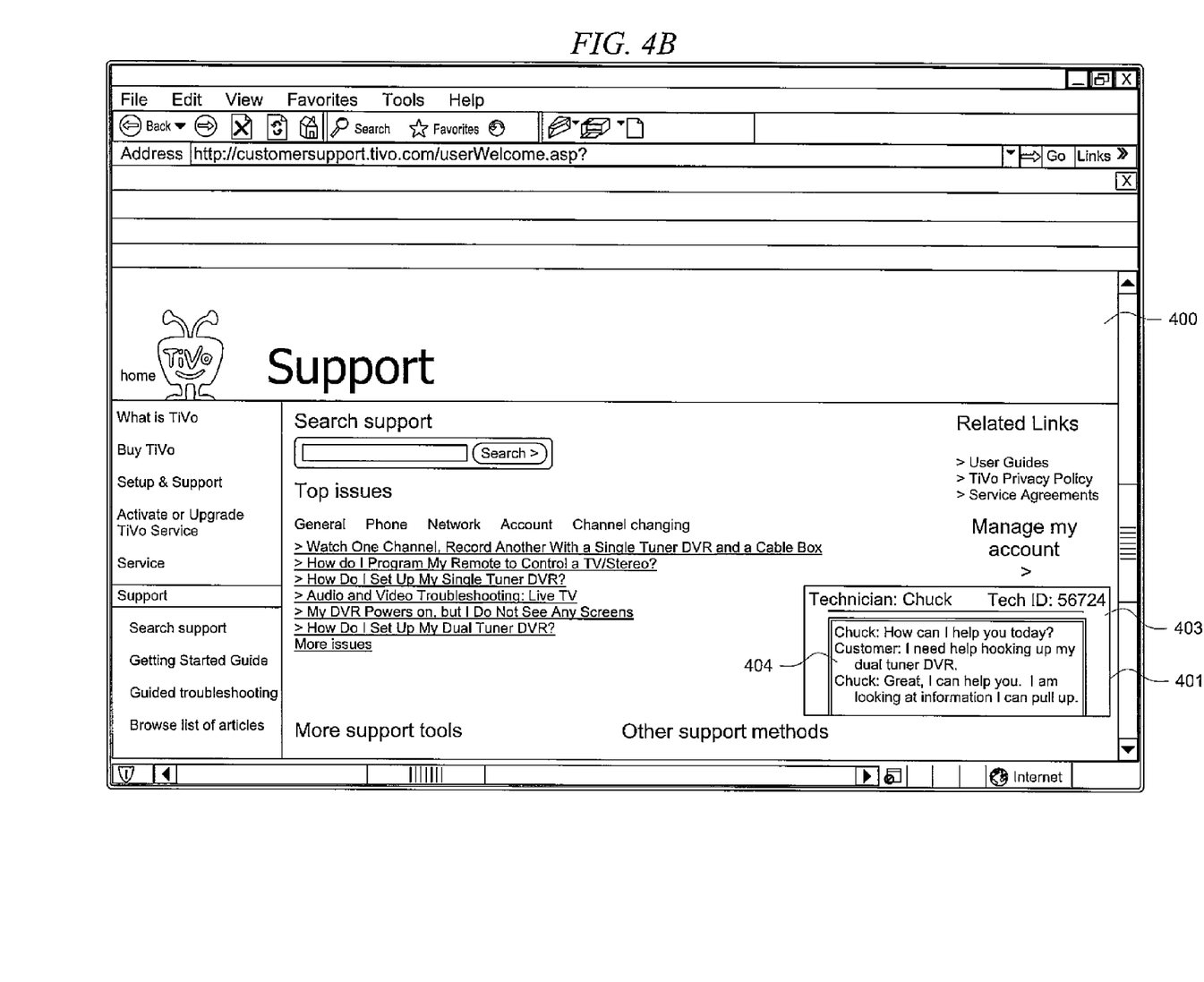
FIG. 4B is a screen shot illustrating the web page further displaying the web frame configured according to one embodiment of the present invention.

FIG. 4B is a screen shot illustrating web page 400 further displaying web frame 401 configured according to one embodiment of the present invention. Web frame 401 exhibits technician interface 403. The selection of hyperlink 402 causes web frame 401 to send a request to the backend server supporting the DVR website for technician interface 403 and to be connected to an available technician. The code and data supporting technician interface 403 is then transmitted to web frame 401 for displaying on web page 400. In FIG. 4B, web frame 401 displays technician interface 403 which includes chat box 404. When technician interface 403 is being processed for display by web frame 401, web frame 401 notes the size of the interface and resizes itself accordingly. As can be seen in FIG. 4B, while web frame 401 becomes larger, it overlaps web browser 400 leaving the user in the same context of the DVR website.

Figure 4C:
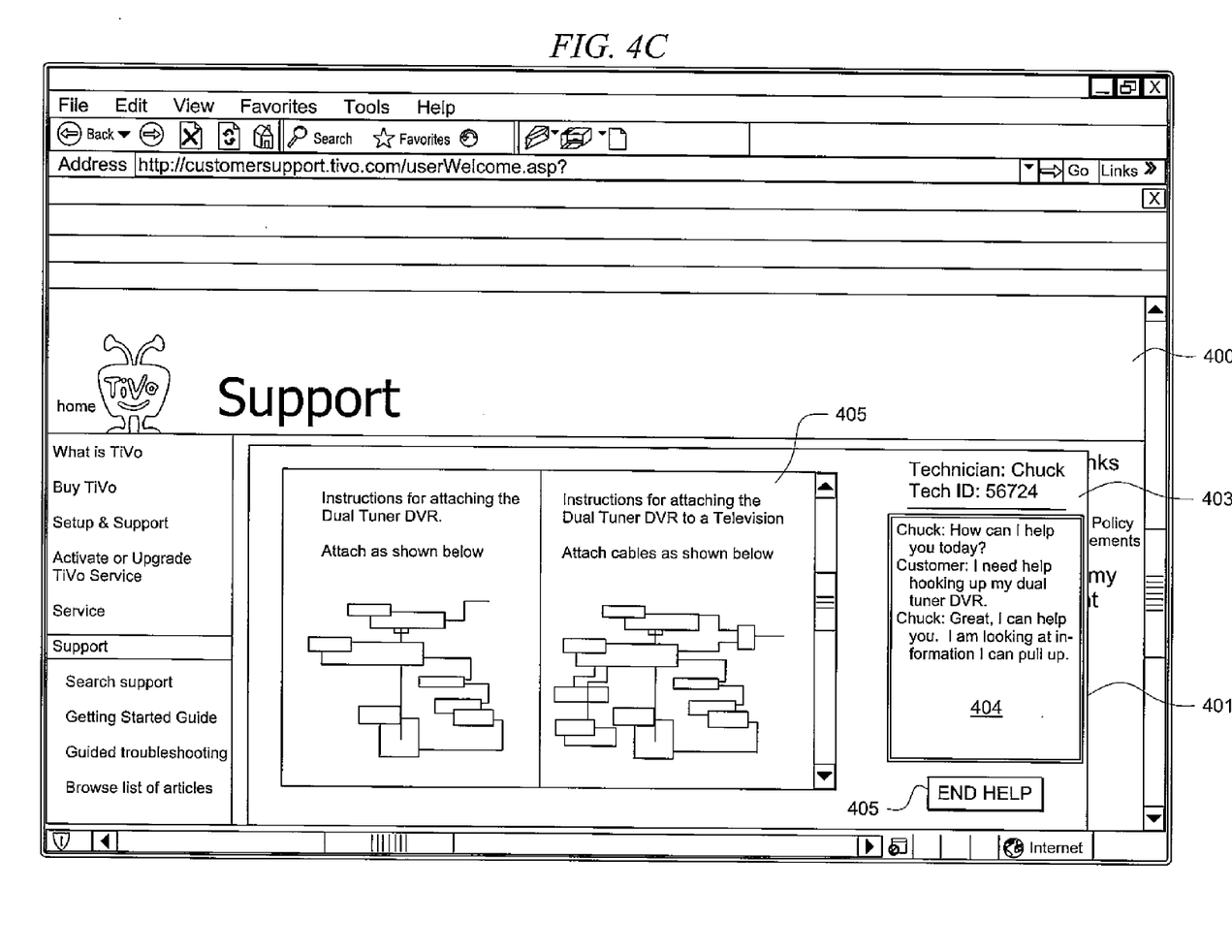
FIG. 4C is a screen shot illustrating the web page further displaying the web frame configured according to one embodiment of the present invention.

The user visiting web page 400 and the technician communicate with each other using chat box 404 in technician interface 403. In this manner, the user asks the questions needing answers, and the technician attempts to answer those questions. However, in some instances, it may be beneficial for the technician to display a chart or diagram that he or she can use to explain the desired process. FIG. 4C is a screen shot illustrating web page 400 further displaying web frame 401 configured according to one embodiment of the present invention. The technician communicating with the user in technician interface 403 determines that he or she wants to display a diagram to the user. The technician opens the diagram document and submits it to the backend server for display to the user. The diagram file is transmitted to web frame 401 which resizes itself again to accommodate diagram 405. The resized version of technician interface 403 running in web frame 401 now includes chat box 404, which allows the technician and user to maintain communication, but now also includes diagram 405, which the technician can use as a visual reference in explaining the requested procedure.

Technician interface 403 displayed in FIG. 4C also includes end help button 406. This button allows the user some control over the interaction session. If the user selects end help button 405, web frame 401 will return to its original state displaying hyperlink 402 (FIG. 4A).

It should be noted that, again, even though web frame 401 is resized to accommodate diagram 405, it only overlaps web page 400, which continues to operate normally. For example, if, in FIG. 4C, the user were to select one of the hyperlinks on web page 400, the web browser would jump to the new web page. However, because the user is interacting with web frame 401 displaying technician interface 403, it would remain the active screen window.

Figure 5:
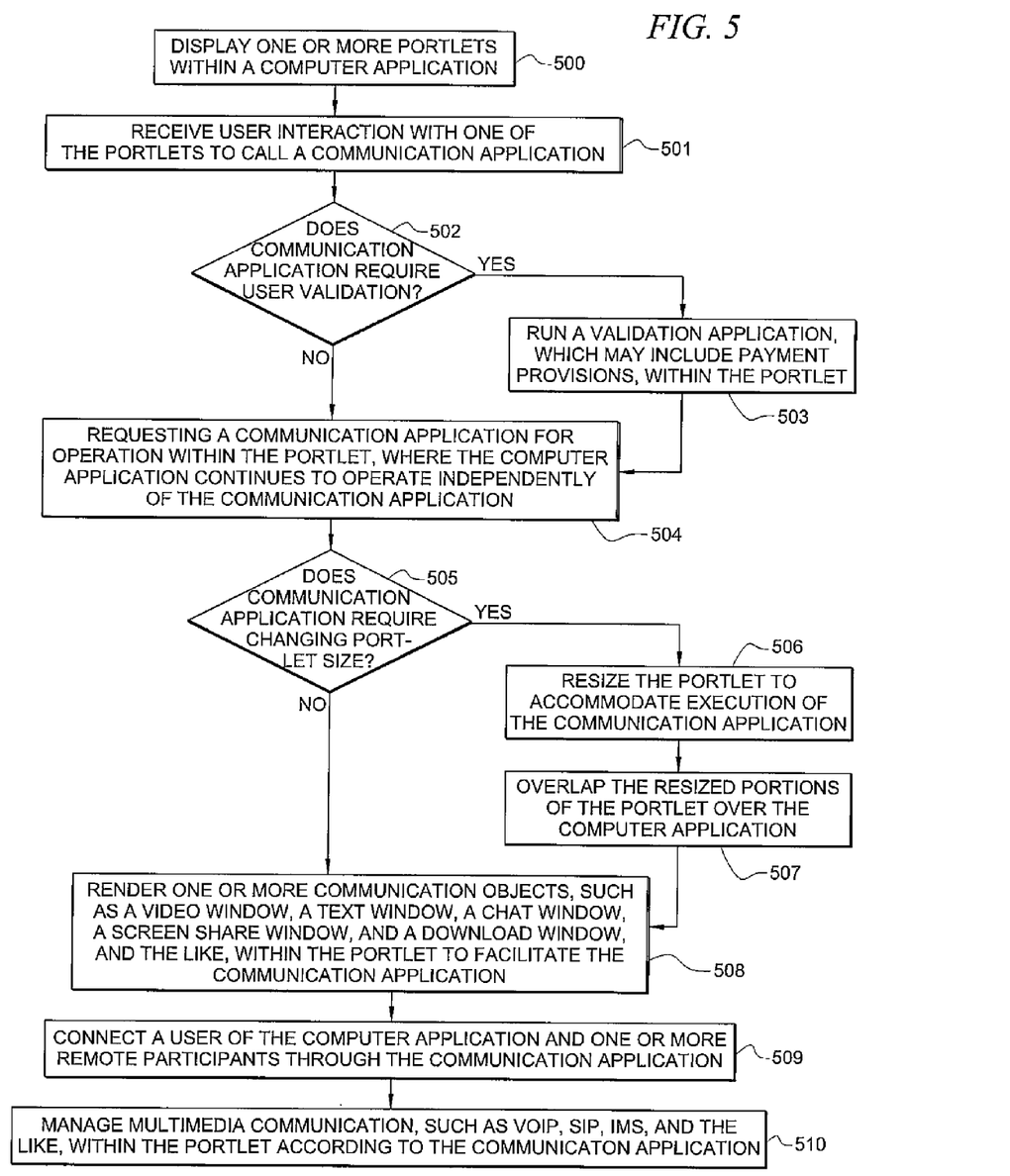
FIG. 5 is a flowchart illustrating example steps executed to implement one embodiment of the present invention.

FIG. 5 is a flowchart illustrating example steps executed to implement one embodiment of the present invention. In step 500, one or more portlets are displayed within a computer application. User interaction with one of the portlets is received, in step 501, to call a communication application. In step 502, a determination is made whether the communication application requires user validation. If so, a validation application, which may include payment provisions, is run, in step 503, within the portlet. In step 504, a communication application is requested for operation within the portlet, where the computer application continues to operate independently of the communication application. In step 505, a determination is made whether communication application requires changing portlet size. If so, the portlet is resized, in step 506, to accommodate execution of the communication application. Further, in step 507, the resized portions of the portlet are overlapped onto the other portions of the computer application. In step 508, one or more communication objects, such as a video window, a text window, a chat window, a screen share window, and a download window, and the like, are rendered within the portlet to facilitate the communication application A user of the computer application and one or more remote participants are then connected, in step 509, through the communication application. Any multimedia communication, such as VoIP, SIP, IMS, and the like, will be managed within the portlet, in step 510, according to the communication application.

The program or code segments making up the various embodiments of the present invention may be stored in a computer readable medium or transmitted by a computer data signal embodied in a carrier wave, or a signal modulated by a carrier, over a transmission medium. The "computer readable medium" may include any medium that can store or transfer information. Examples of the computer readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, and the like. The computer data signal may include any signal that can propagate over a transmission medium such as electronic network channels, optical fibers, air, electromagnetic, RF links, and the like. The code segments may be downloaded via computer networks such as the Internet, Intranet, and the like.

Figure 6:
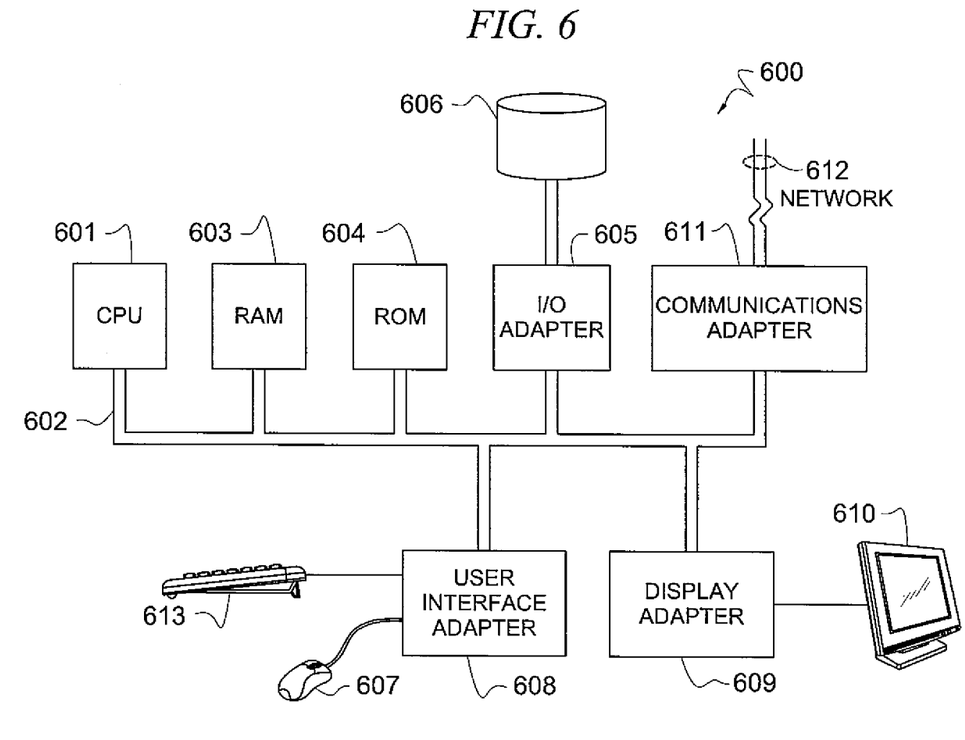
FIG. 6 illustrates a computer system adapted to use embodiments of the present invention.

FIG. 6 illustrates computer system 600 adapted to use embodiments of the present invention, e.g. storing and/or executing software associated with the embodiments. Central processing unit (CPU) 601 is coupled to system bus 602. The CPU 601 may be any general purpose CPU. However, embodiments of the present invention are not restricted by the architecture of CPU 601 as long as CPU 601 supports the inventive operations as described herein. Bus 602 is coupled to random access memory (RAM) 603, which may be SRAM, DRAM, or SDRAM. ROM 604 is also coupled to bus 602, which may be PROM, EPROM, or EEPROM. RAM 603 and ROM 604 hold user and system data and programs as is well known in the art.

Bus 602 is also coupled to input/output (I/O) controller card 605, communications adapter card 611, user interface card 608, and display card 609. The I/O adapter card 605 connects storage devices 606, such as one or more of a hard drive, a CD drive, a floppy disk drive, a tape drive, to computer system 600. The I/O adapter 605 is also connected to a printer (not shown), which would allow the system to print paper copies of information such as documents, photographs, articles, and the like. Note that the printer may be a printer (e.g., dot matrix, laser, and the like), a fax machine, scanner, or a copier machine. Communications card 611 is adapted to couple the computer system 600 to a network 612, which may be one or more of a telephone network, a local (LAN) and/or a wide-area (WAN) network, an Ethernet network, and/or the Internet network. User interface card 608 couples user input devices, such as keyboard 613, pointing device 607, and the like, to the computer system 600. The display card 609 is driven by CPU 601 to control the display on display device 610.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system comprising:
a processor; and
a memory having instructions stored thereon that, if executed by the processor, cause the processor to implement program components, the program components comprising:
 a browser that configures the system to display:
  a single web page comprising a plurality of portlets in a shared display area of the browser, each of the plurality of portlets being a component of the single web page, wherein the single web page is associated with a single website; and
  a communication trigger within one of the plurality of portlets in the shared display area; and
 a communications application that configures the system to:
  display a communication object within one of the plurality of portlets in response to selection of the communication trigger; and
  maintain, using the one of the plurality of portlets, a communications channel to exchange communications with a remote participant,
wherein the communications application configures the system to provide the communication object and the communications channel independently of the browser, and wherein displaying the communication object includes resizing one or more of the communication object and the one of the plurality of portlets in order to accommodate the exchange of communications.

2. The system set forth in claim 1, wherein the remote participant is a vendor.

3. The system set forth in claim 1, wherein the browser defines a state after displaying the web page, wherein the state of browser before the communications application provides the communications channel is the same after the communications application provides the communications channel.

4. The system set forth in claim 1, wherein the communications application comprises an instance of a media player.

5. The system set forth in claim 4, wherein the browser comprises a first instance of the media player and the communications application comprises a second instance of the media player.

6. The system set forth in claim 1, wherein the communication trigger comprises a banner advertisement.

7. The system set forth in claim 1, wherein the web page and each of the plurality of portlets are displayed in the shared display area.

8. A non-transitory computer-readable medium having instructions stored thereon, that when executed by a computing device, cause the computing device to perform operations, the operations comprising:

displaying, by a browser:
  a single web page comprising a plurality of portlets in a shared display area of the browser, each of the plurality of portlets being a component of the single web page, wherein the single web page is associated with a single website; and
  a communication trigger within one of the plurality of portlets in the shared display area; and
executing a communications application, the communications application being configured to:
  display a communication object within one of the plurality of portlets in response to selection of the communication trigger; and
  maintain, using the one of the plurality of portlets, a communications channel to exchange communications with a remote participant,
wherein the communications application provides the communication object and the communications channel independently of the browser, and wherein displaying the communication object includes resizing one or more of the communication object and the one of the plurality of portlets in order to accommodate the exchange of communications.

9. The computer-readable medium of claim 8, wherein the remote participant is a vendor.

10. The computer-readable medium of claim 8, wherein the browser defines a state after displaying the web page, wherein the state of the browser before the communications application provides the communications channel is the same after the communications application provides the communications channel.

11. The computer-readable medium of claim 8, wherein the communications application comprises an instance of a media player.

12. The computer-readable medium of claim 11, wherein the browser comprises a first instance of the media player and the communications application comprises a second instance of the media player.

13. The computer-readable medium of claim 8, wherein the communication trigger comprises a banner advertisement.

14. The computer-readable medium of claim 8, wherein the web page and each of the plurality of portlets are displayed in the shared display area.

15. A computer implemented method, comprising:
displaying, by a browser executing on a computing device:
  a single web page comprising a plurality of portlets in a shared display area of the browser, each of the plurality of portlets being a component of the single web page, wherein the single web page is associated with a single website; and
  a communication trigger within one of the plurality of portlets in the shared display area; and
executing a communications application, the communications application being configured to:
  display a communication object within one of the plurality of portlets in response to selection of the communication trigger; and
  maintain, using the one of the plurality of portlets, a communications channel to exchange communications with a remote participant,
wherein the communications application provides the communication object and the communications channel independently of the browser, and wherein displaying the communication object includes resizing one or more of the communication object and the one of the plurality of portlets in order to accommodate the exchange of communications.

16. The method of claim 15, wherein the remote participant is a vendor.

17. The method of claim 15, wherein the browser defines a state after displaying the web page, wherein the state of the browser before the communications application provides the communications channel is the same after the communications application provides the communications channel.

18. The method of claim 15, wherein the communications application comprises an instance of a media player.

19. The method of claim 18, wherein the browser comprises a first instance of the media player and the communications application comprises a second instance of the media player.

20. The method of claim 15, wherein the communication trigger comprises a banner advertisement.

21. The method of claim 15, wherein the web page and each of the plurality of portlets are displayed in the shared display area.

* * * * *